US011150467B2

(12) United States Patent
Saito (10) Patent No.: US 11,150,467 B2
(45) Date of Patent: Oct. 19, 2021

(54) OPTICAL SYSTEM AND IMAGE PICKUP APPARATUS INCLUDING THE SAME CONSISTING OF TWO LENS UNITS OF −+ REFRACTIVE POWERS HAVING SEVEN LENSES OF −−++−+− REFRACTIVE POWERS OR EIGHTH LENSES OF −−++−+−+ REFRACTIVE POWERS

(71) Applicant: CANON KABUSHIKI KAISHA, Tokyo (JP)

(72) Inventor: Shinichiro Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 16/587,534

(22) Filed: Sep. 30, 2019

(65) Prior Publication Data

US 2020/0103647 A1 Apr. 2, 2020

(30) Foreign Application Priority Data

Oct. 1, 2018 (JP) .............................. JP2018-186423
Jul. 5, 2019 (JP) .............................. JP2019-126339

(51) Int. Cl.
*G02B 13/00* (2006.01)
*G02B 27/00* (2006.01)
*G02B 13/04* (2006.01)

(52) U.S. Cl.
CPC ....... *G02B 27/0025* (2013.01); *G02B 13/001* (2013.01); *G02B 13/04* (2013.01)

(58) Field of Classification Search
CPC ... G02B 13/04; G02B 13/001; G02B 15/1425
See application file for complete search history.

(56) References Cited

U.S. PATENT DOCUMENTS

| 2014/0118603 | A1 | 5/2014 | Saito |
| 2014/0293444 | A1* | 10/2014 | Abe ...................... G02B 13/04 359/714 |
| 2015/0153549 | A1* | 6/2015 | Muratani ........... G02B 15/1425 359/691 |
| 2018/0164558 | A1 | 6/2018 | Saito |
| 2019/0041605 | A1 | 2/2019 | Saito et al. |
| 2019/0041606 | A1 | 2/2019 | Saito et al. |

FOREIGN PATENT DOCUMENTS

| JP | 2002072085 A | 3/2002 |
| JP | 2013238684 A | 11/2013 |

* cited by examiner

*Primary Examiner* — Wen Huang
(74) *Attorney, Agent, or Firm* — Carter, DeLuca & Farrell LLP (57) ABSTRACT

Provided is an optical system consisting of, in order from an object side to an image side: a first lens unit having a negative refractive power; an aperture stop; and a second lens unit having a positive refractive power, in which each of the first lens unit and the second lens unit includes a negative lens. A focal length (fG1N) of a negative lens (G1N) arranged closest to the object side in the first lens unit, a focal length (fGLN) of a negative lens (GLN) having a largest negative refractive power in the second lens unit, a focal length (f) of the optical system, a focal length (f1) of the first lens unit, and other factors are appropriately set.

13 Claims, 7 Drawing Sheets

OPTICAL SYSTEM AND IMAGE PICKUP APPARATUS INCLUDING THE SAME CONSISTING OF TWO LENS UNITS OF −+ REFRACTIVE POWERS HAVING SEVEN LENSES OF −−++−+− REFRACTIVE POWERS OR EIGHTH LENSES OF −−++−+−+ REFRACTIVE POWERS

This application claims the benefit of Japanese Patent Application No. 2018-186423, filed Oct. 1, 2018, and Japanese Patent Application No. 2019-126339, filed Jul. 5, 2019, which are hereby incorporated by reference herein in their entirety.

BACKGROUND OF THE INVENTION

Field of the Invention

The present invention relates to an optical system and an image pickup apparatus including the same, and is suitable as an image pickup optical system used with an image pickup apparatus, for example, a digital still camera, a video camera, a monitoring camera, or an in-vehicle camera, in particular.

Description of the Related Art

In recent years, the number of pixels of an image pickup element, for example, a CCD or CMOS sensor, has increased, and it is desired of an image pickup optical system for use with an image pickup apparatus using the image pickup element to have high optical performance and provide a wide image pickup field of view (have a wide angle of view). In recent years, as an optical system capable of capturing a region having an image pickup half angle of view exceeding 80° in an image circle having a particular size, a fisheye lens and a super wide angle lens have been proposed (Japanese Patent Application Laid-Open No. 2013-238684).

It is strongly desired of an image pickup optical system used with an image pickup apparatus to have a wide angle of view and high optical performance while being compact as the entire lens system. Generally in an image pickup optical system having a wide angle of view, a lens unit having a negative refractive power is arranged on an object side of an aperture stop, and a lens unit having a positive refractive power is arranged on an image side of the aperture stop. The image pickup optical system having the wide angle of view has a lens configuration that is asymmetric with respect to the aperture stop, and hence it is difficult to satisfactorily correct chromatic aberrations, such as chromatic aberration of magnification, and obtain high optical performance while achieving the wide angle of view.

As projection methods for a fisheye lens, orthographic projection, equisolidangle projection, equidistant projection, and stereographic projection are known. Among those methods, the equisolidangle projection method has the property that a solid angle of a figure on a spherical surface is proportional to an area on a projecting plane, and hence is used in a visual environment evaluation, for example. Meanwhile, the fisheye lens adopts a configuration in which negative distortion occurs as opposed to a super wide angle lens, and hence it becomes difficult to satisfactorily correct chromatic aberration of magnification.

In order to satisfactorily correct various aberrations, such as chromatic aberration of magnification, while downsizing and reducing the weight of the image pickup optical system, it is important to appropriately set optical arrangement of the lens units, refractive powers and dispersion characteristics of materials of the lens units, and other factors.

SUMMARY OF THE INVENTION

It is an object of the present invention to provide an optical system having a wide angle of view, being compact as the entire system, and having high optical performance, and an image pickup apparatus including the same.

According to at least one embodiment of the present invention, there is provided an optical system consisting of, in order from an object side to an image side: a first lens unit having a negative refractive power; an aperture stop; and a second lens unit having a positive refractive power, the first lens unit including at least two negative lenses including a negative lens G1N arranged closest to the object side in the first lens unit the second lens unit including at least one negative lens, wherein conditional expressions: $0.1 < fG1N/f1 < 1.0$; and $0.1 < |fGLN/f| < 2.5$, are satisfied where fG1N represents a focal length of the negative lens G1N, fGLN represents a focal length of a negative lens GLN having a largest negative refractive power in the second lens unit, f represents a focal length of the optical system, and f1 represents a focal length of the first lens unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An optical system according to at least one embodiment of the present invention consists of, in order from an object side to an image side, a first lens unit having a negative refractive power, an aperture stop, and a second lens unit having a positive refractive power. The entire lens system is configured to move during focusing.

Figure 1:
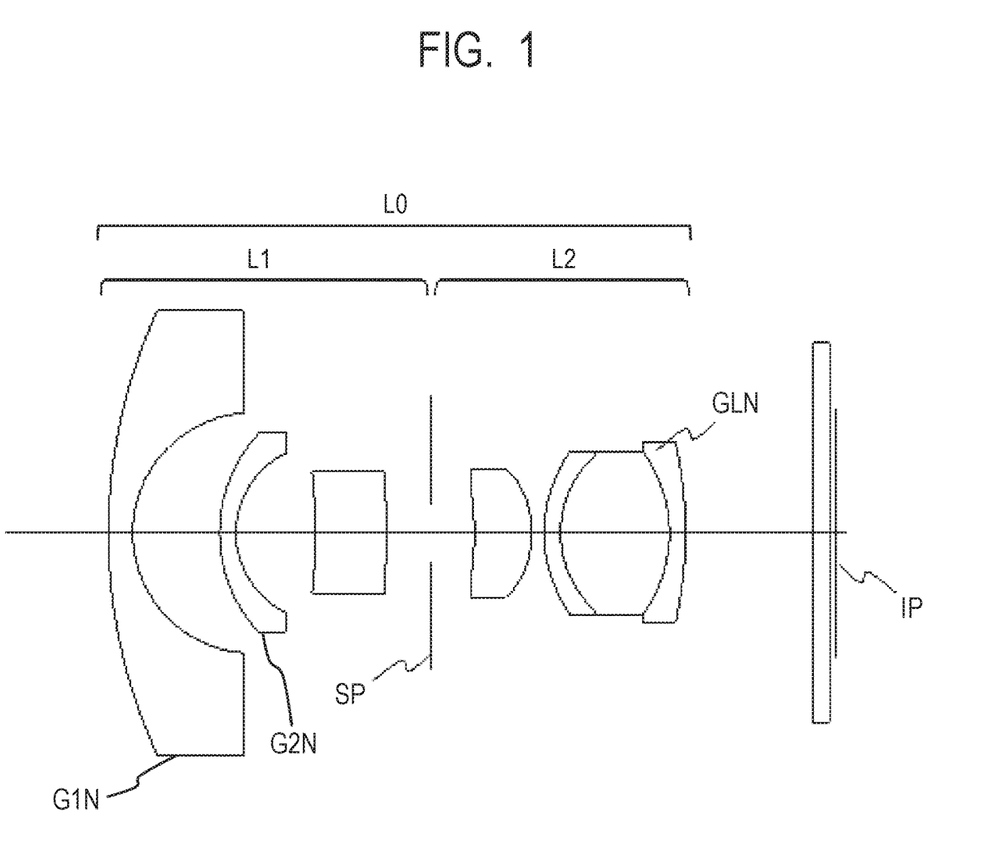
FIG. 1 is a lens cross-sectional view of an optical system according to Embodiment 1 of the present invention.
Figure 2:
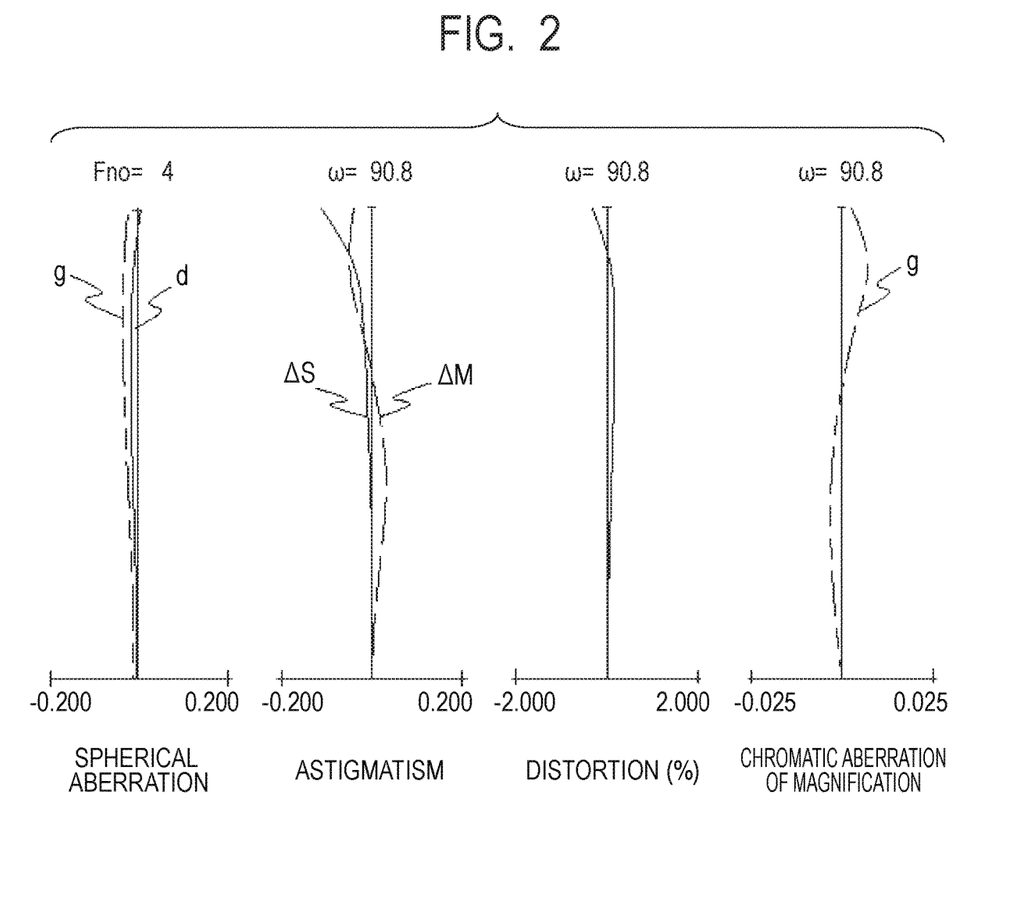
FIG. 2 is aberration diagrams of the optical system according to Embodiment 1 when focused at infinity.
Figure 3:
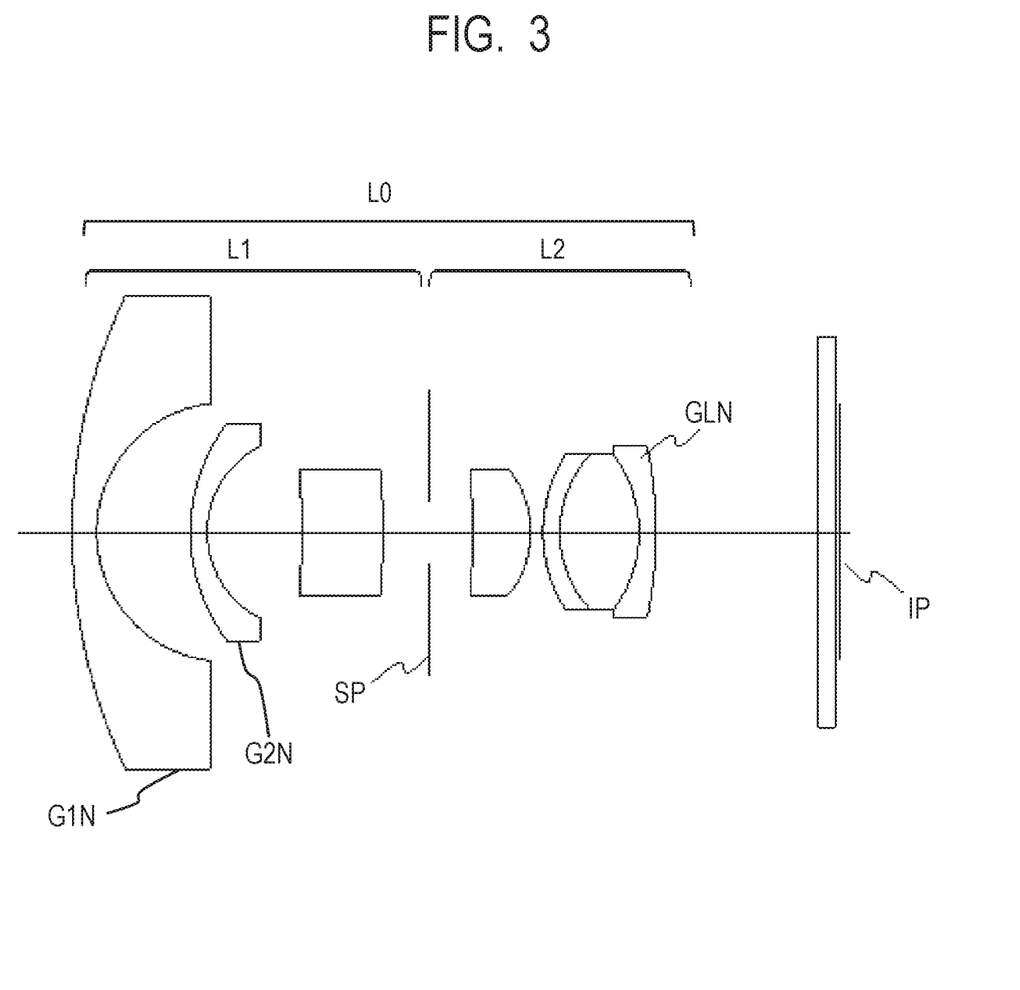
FIG. 3 is a lens cross-sectional view of an optical system according to Embodiment 2 of the present invention.
Figure 4:
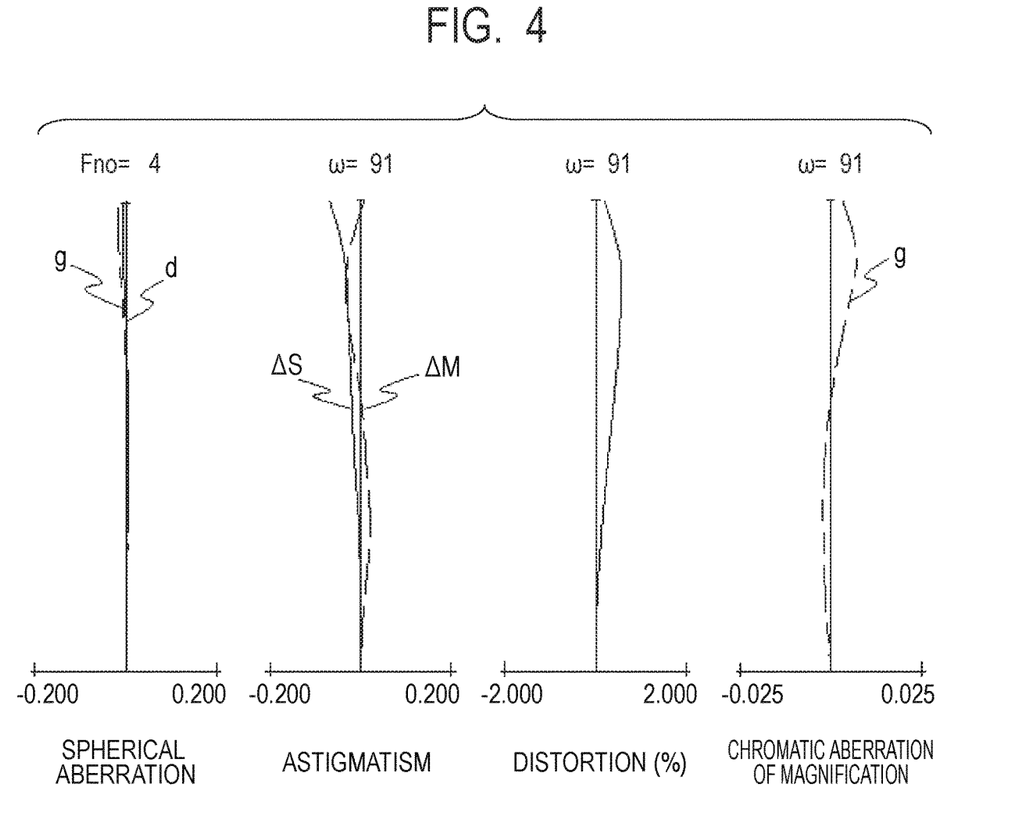
FIG. 4 is aberration diagrams of the optical system according to Embodiment 2 when focused at infinity.
Figure 5:
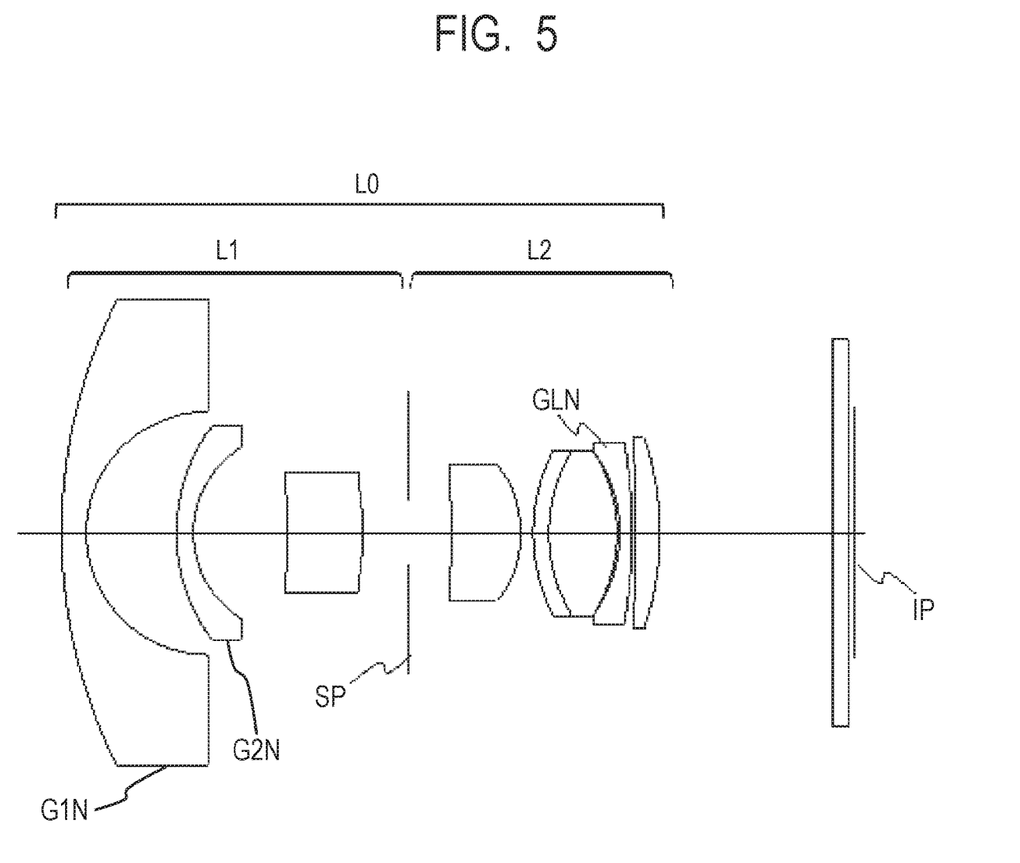
FIG. 5 is a lens cross-sectional view of an optical system according to Embodiment 3 of the present invention.
Figure 6:
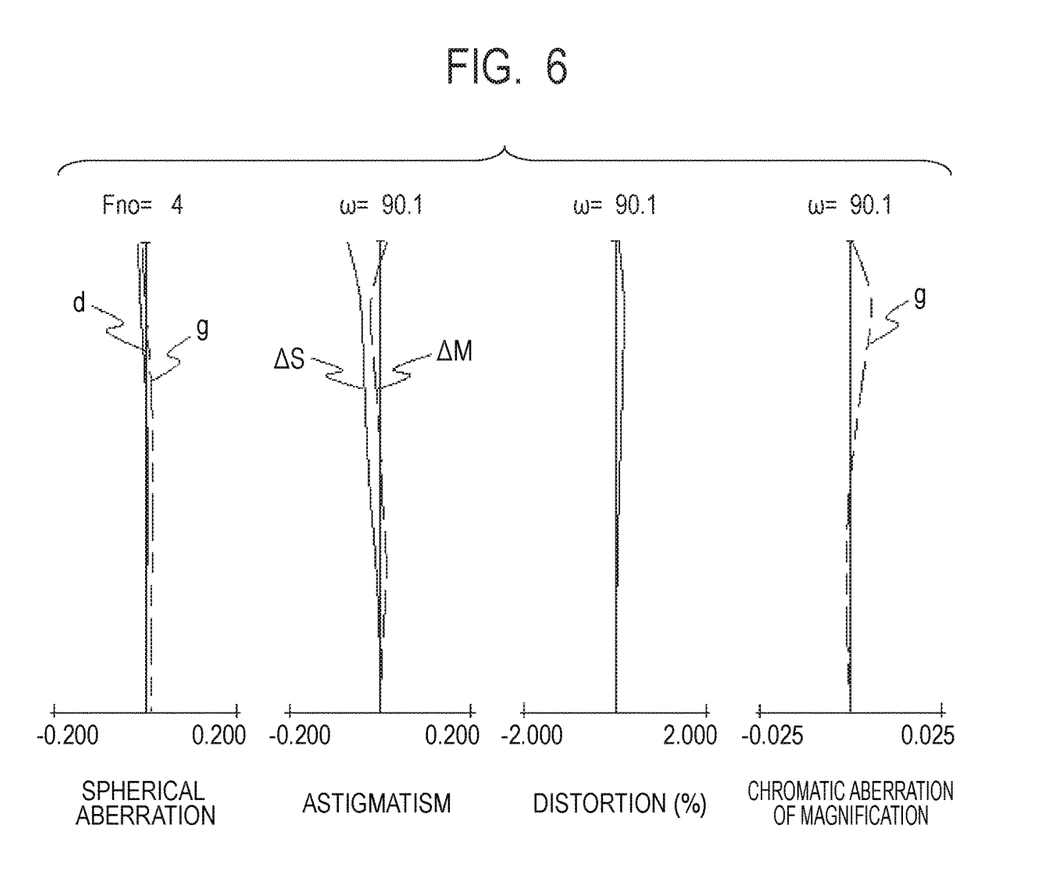
FIG. 6 is aberration diagrams of the optical system according to Embodiment 3 when focused at infinity.

FIG. 1, FIG. 3, and FIG. 5 are lens cross-sectional views of optical systems according to Embodiments 1 to 3 of the present invention. FIG. 2, FIG. 4, and FIG. 6 are aberration diagrams of the optical systems according to Embodiments 1 to 3.

Embodiment 1 relates to an optical system having an F-number of 4.0 and an image pickup half angle of view of 91°. Embodiment 2 relates to an optical system having an F-number of 4.0 and an image pickup half angle of view of 91°. Embodiment 3 relates to an optical system having an F-number of 4.0 and an image pickup half angle of view of 90°.

The optical system according to each of Embodiments is an image pickup optical system for use with an image pickup apparatus, for example, a digital still camera, a video camera, a monitoring camera, or an in-vehicle camera. In the lens cross-sectional views, the left side is an object side (front side), and the right side is an image side (rear side). An optical system L0 includes a first lens unit L1 and a second lens unit L2.

An aperture stop SP is configured to determine (restrict) a light flux at an open F-number (Fno). As an image plane IP, an image pickup surface of a solid-state image pickup element (photoelectric conversion element), for example, a CCD sensor or a CMOS sensor, is placed when in use as a photographing optical system of a digital still camera or a video camera.

In the aberration diagrams, an F-number is represented by Fno. An image pickup half angle of view (degrees) is represented by "w", and is an angle of view obtained by ray tracing. In the spherical aberration diagrams, "d" indicates a d-line (wavelength: 587.56 nm) and "g" indicates a g-line (wavelength: 435.835 nm).

In the astigmatism diagrams, ΔS indicates a sagittal image plane with respect to the d-line, and AM indicates a meridional image plane with respect to the d-line. The distortion is depicted for the d-line. In the diagrams of chromatic aberration of magnification, "g" indicates a g-line.

As a projection method in the optical system L0 according to each of Embodiments of the present invention, an equisolidangle projection method (Y=2·f·sin(θ/2)) is adopted. In the optical system L0 according to at least one embodiment of the present invention, the projection method is not limited to equisolidangle projection, and any projection method may be adopted.

The optical system L0 according to at least one embodiment of the present invention consists of, in order from an object side to an image side, the first lens unit L1 having the negative refractive power, the aperture stop SP, and the second lens unit L2 having the positive refractive power. Each of the first lens unit L1 and the second lens unit has a negative lens. A focal length of a negative lens G1N arranged closest to the object side in the first lens unit L1 is represented by fG1N. A focal length of a negative lens GLN having a largest negative refractive power in the second lens unit is represented by fGLN. A focal length of the optical system L0 is represented by "f", and a focal length of the first lens unit L1 is represented by f1. At this time, the following conditional expressions are satisfied.

$$0.10 < fG1N/f1 < 1.00 \tag{1}$$

$$0.10 < |fGLN/f| < 2.50 \tag{2}$$

The "total lens length" as used herein is a value obtained by adding an air-equivalent back focus to a distance from the first lens surface on the object side to a lens surface closest to the image side. In general, as the total lens length is reduced to downsize the entire optical system, large amounts of various aberrations, in particular, chromatic aberrations, such as chromatic aberration of magnification, occur, with the result that optical performance is reduced. In a retrofocus optical system with a reduced total lens length, in particular, the first lens unit L1 having the negative refractive power tends to be upsized, and it is important to appropriately set a lens configuration, refractive power arrangement, and other factors of the first lens unit L1.

In each of Embodiments, the negative refractive power of the negative lens GLN in the second lens unit L2 is appropriately set to reduce the total lens length and the back focus.

In the conditional expression (1), the focal length of the negative lens G1N arranged closest to the object side in the first lens unit L1 is defined by the focal length of the first lens unit L1, to thereby downsize the optical system L0 and achieve a wide angle of view. When the ratio exceeds the upper limit of the conditional expression (1), it is advantageous to correct chromatic aberration of magnification, but an effective diameter of a front lens is increased. When the ratio falls below the lower limit of the conditional expression (1), it becomes difficult to correct curvature of field and distortion, the number of lenses is increased, and the total lens length is increased.

In the conditional expression (2), the focal length of the negative lens GLN having the largest negative refractive power in the second lens unit L2 is defined by the focal length of the optical system L0 to reduce the back focus and the total lens length. When the ratio exceeds the upper limit of the conditional expression (2), it becomes easy to correct aberrations, but it becomes difficult to reduce the back focus, with the result that the total lens length is increased, and the optical system is upsized. When the ratio falls below the lower limit of the conditional expression (2), a change in off-axial comatic aberration in accordance with an image height becomes larger, and it becomes difficult to correct curvature of field and astigmatism, with the result that the number of lenses is disadvantageously increased.

In each of Embodiments, as described above, each element is appropriately set so as to satisfy the conditional expressions (1) and (2). As a result, there is obtained an optical system, which is compact, and in which various aberrations, such as chromatic aberrations, are satisfactorily corrected.

In each of Embodiments, it is further preferred to set the numerical value ranges of the conditional expressions (1) and (2) as follows.

$$0.50 < fG1N/f1 < 0.92 \tag{1a}$$

$$1.00 < |fGLN/f| < 2.40 \tag{2a}$$

It is further preferred to set the numerical value ranges of the conditional expressions (1a) and (2a) as follows.

$$0.70 < fG1N/f1 < 0.88 \tag{1b}$$

$$2.00 < |fGLN/f| < 2.30 \tag{2b}$$

In each of Embodiments, the configurations of the lens units are appropriately set as described above to satisfy the conditional expressions (1) and (2), to thereby provide the optical system that achieves a large aperture ratio, is compact as the entire lens system, and has high imaging performance by satisfactorily correcting chromatic aberrations.

Further, a curvature radius of a lens surface on the object side of the negative lens GLN is represented by R1GLN, and a curvature radius of a lens surface on the image side of the negative lens GLN is represented by R2GLN. Here, when the lens surfaces have aspherical shapes, each of the curvature radius of the lens surface on the object side and the curvature radius of the lens surface on the image side means its base R (radius of a quadric surface as a reference). A refractive index of a material of the negative lens GLN is represented by ndGLN. A total lens length of the optical system is represented by TD.

A back focus of the optical system is represented by SK. The first lens unit L1 includes a negative lens G2N arranged adjacent to, and on the image side of, the negative lens G1N, and a focal length of the negative lens G2N is represented by fG2N. A focal length of the second lens unit L2 is represented by f2. The second lens unit L2 includes at least one positive lens, and an average value of an Abbe number of a material of the positive lens included in the second lens unit L2 is represented by vdP2. An Abbe number vd of a material is defined as:

$$vd=(Nd-1)/(NF-NC),$$

where Nd, NF, and NC are refractive indices with respect to a d-line, an F-line, and a C-line of Fraunhofer lines, respectively. An average value of refractive indices of materials of negative lenses included in the second lens unit L2 is represented by ndN2.

In the image pickup apparatus including an image pickup element configured to receive an image formed by the optical system according to each of Embodiments, "ω" represents an image pickup half angle of view obtained by ray tracing.

In this case, it is preferred to satisfy one or more of the following conditional expressions.

$$1.0<(R2GLN+R1GLN)/(R2GLN-R1GLN)<6.0 \quad (3)$$

$$1.85<ndGLN<2.40 \quad (4)$$

$$1.0<TD/f<10.0 \quad (5)$$

$$0.5<SK/f<2.6 \quad (6)$$

$$0.30<fG1N/fG2N<0.80 \quad (7)$$

$$-2.0<f1/f2<-1.0 \quad (8)$$

$$75<vdP2<100 \quad (9)$$

$$1.86<ndN2<2.40 \quad (10)$$

$$80°<ω<120° \quad (11)$$

Next, technical meanings of the above-mentioned conditional expressions are described.

In the conditional expression (3), a shape factor (lens shape) of the negative lens GLN having the largest negative refractive power in the second lens unit L2 is defined, and it is mainly intended to reduce the back focus while satisfactorily correcting curvature of field. When the shape factor exceeds the upper limit of the conditional expression (3), a meniscus shape of the negative lens GLN becomes stronger, and it becomes difficult to ensure a desired refractive power, with the result that the total lens length is disadvantageously increased, and further, it becomes difficult to manufacture the negative lens GLN. When the shape factor falls below the lower limit of the conditional expression (3), a large amount of distortion tends to disadvantageously occur in a positive direction, and further, it becomes difficult to correct both of curvature of field and chromatic aberration of magnification.

In the conditional expression (4), the refractive index of a material of the negative lens GLN having the largest negative refractive power in the second lens unit L2 is defined. Because of the characteristics of the optical material, as the refractive index becomes larger, an Abbe number becomes smaller, and chromatic aberration of magnification becomes undercorrected. Therefore, in order to correct chromatic aberrations, the refractive power is necessarily reduced, and the total lens length is increased.

Further, in a retrofocus optical system, when the number of constituent lenses is reduced to downsize the optical system, a Petzval sum tends to have a negative value, an image plane inclines toward the side of overcorrection, and an astigmatic difference is increased. Therefore, it is important to appropriately set the refractive index of the material of the negative lens to satisfactorily correct curvature of field and the astigmatic difference.

When the refractive index exceeds the upper limit of the conditional expression (4), it becomes easy to correct the image plane, but it becomes difficult to correct distortion and chromatic aberration of magnification. When the refractive index falls below the lower limit of the conditional expression (4), it is required to reduce the refractive power of the material of the negative lens GLN in order to correct curvature of field, with the result that the back focus is disadvantageously increased.

In the conditional expression (5), the total lens length TD is defined by the focal length "f" of the optical system L0, and it is mainly intended to satisfactorily correct off-axial aberration while downsizing the optical system. When the ratio exceeds the upper limit of the conditional expression (5), the entire optical system is upsized, and an amount of correction of off-axial aberration, in particular, coma flare in a sagittal direction is disadvantageously increased. When the ratio falls below the lower limit of the conditional expression (5), the total lens length is reduced, with the result that it becomes difficult to correct various aberrations, such as comatic aberration and curvature of field.

In the conditional expression (6), the back focus SK is defined by the focal length "f" of the optical system L0, and a so-called "retro ratio" is defined. When the ratio exceeds the upper limit of the conditional expression (6), and the back focus is increased, it becomes difficult to correct distortion and curvature of field, and the number of lenses is disadvantageously increased. When the ratio falls below the lower limit of the conditional expression (6), and the back focus is reduced, it becomes difficult to arrange a shutter member and other members on the image side.

In the conditional expression (7), shares of the refractive power of the negative lens G1N and the refractive power of the negative lens G2N are defined. In the conditional expression (7), two negative lenses are arranged in order from the object side to the image side in order to achieve a wide angle of view while downsizing the optical system, and their shares of the refractive powers are defined. When the ratio exceeds the upper limit of the conditional expression (7), and the negative refractive power of the negative lens G1N closest to the object side becomes weaker (absolute value of the negative refractive power becomes smaller), the effective diameter of the front lens is increased. When the ratio falls below the lower limit of the conditional expression (7), and the negative refractive power of the negative lens G1N closest to the object side becomes stronger (absolute value of the negative refractive power becomes larger), it becomes advantageous for the downsizing of the optical system, but it becomes difficult to correct curvature of field and astigmatism.

In the conditional expression (8), the focal length f1 of the first lens unit L1 having the negative refractive power is defined by the focal length f2 of the second lens unit L2 having the positive refractive power. When the ratio exceeds the upper limit of the conditional expression (8), and the negative refractive power of the first lens unit L1 becomes stronger, an action of dispersing a marginal ray becomes stronger, and it becomes difficult to correct spherical aberration and comatic aberration in the second lens unit L2. When the ratio falls below the lower limit of the conditional expression (8), and the positive refractive power of the second lens unit L2 becomes stronger, a converging action of the second lens unit L2 becomes stronger, and it becomes disadvantageously difficult to correct second-order spectra of chromatic aberration of magnification and axial chromatic aberration.

In the conditional expression (9), the average value vdP2 of the Abbe numbers of the materials of the positive lenses included in the second lens unit L2 is defined, and it is mainly intended to satisfactorily correct axial chromatic aberration and chromatic aberration of magnification while reducing the total lens length. When the average value exceeds the upper limit of the conditional expression (9), it becomes easy to correct axial chromatic aberration and chromatic aberration of magnification, but curvature radii of the lens surfaces of the lenses become larger, with the result that spherical aberration and comatic aberration become disadvantageously undercorrected. When the average value falls below the lower limit of the conditional expression (9), chromatic aberrations are increased, and it becomes difficult to correct aberrations as the entire optical system.

In the conditional expression (10), the average value ndN2 of the refractive indices of the materials of the negative lenses included in the second lens unit L2 is defined, and it is mainly intended to satisfactorily correct curvature of field and distortion. When the average value exceeds the upper limit of the conditional expression (10), it becomes easy to downsize the optical system, but it becomes difficult to correct chromatic aberration of magnification. When the average value falls below the lower limit of the conditional expression (10), it becomes difficult to correct curvature of field.

In the conditional expression (11), an image pickup half angle of view "ω" obtained by ray tracing is defined in an image pickup apparatus including an image pickup element configured to receive an image formed by the optical system according to each of Embodiments. When the maximum image pickup half angle of view becomes larger to exceed the upper limit of the conditional expression (11), image compression at each angle of view becomes higher, and it becomes difficult to obtain sufficient resolution. When the image pickup half angle of view falls below the lower limit of the conditional expression (11), it becomes difficult to obtain a required angle of view as a circular fisheye lens.

It is preferred to set the numerical value ranges of the conditional expressions (3) to (10) as follows.

$$1.3<(R2GLN+R1GLN)/(R2GLN-R1GLN)<3.0 \quad (3a)$$

$$1.95<ndGLN<2.20 \quad (4a)$$

$$3.0<TD/f<8.0 \quad (5a)$$

$$1.2<SK/f<2.4 \quad (6a)$$

$$0.35<fG1N/fG2N<0.70 \quad (7a)$$

$$-1.6<f1/f2<-1.1 \quad (8a)$$

$$80<vdP2<95 \quad (9a)$$

$$1.90<ndN2<2.10 \quad (10a)$$

It is further preferred to set the numerical value ranges of the conditional expressions (3a) to (10a) as follows.

$$1.6<(R2GLN+R1GLN)/(R2GLN-R1GLN)<2.0 \quad (3b)$$

$$2.00<ndGLN<2.10 \quad (4b)$$

$$6.0<TD/f<7.0 \quad (5b)$$

$$1.6<SK/f<2.2 \quad (6b)$$

$$0.40<fG1N/fG2N<0.60 \quad (7b)$$

$$-1.4<f1/f2<-1.2 \quad (8b)$$

$$85<vdP2<92 \quad (9b)$$

$$1.92<ndN2<1.98 \quad (10b)$$

As described above, according to the present invention, the optical system that is compact as the entire system, satisfactorily corrects chromatic aberrations, and has high optical performance can be obtained.

In the optical system according to each of Embodiments, it is preferred that the first lens unit L1 include at least two negative lenses including the negative lens G1N. With this configuration, it becomes easy for the optical system to achieve the wide angle of view.

In the optical system according to each of Embodiments, it is preferred that the lens surface closest to the image side have a convex shape toward the image side. With this configuration, ghost caused by light reflected by an image pickup surface can be reduced.

Further, it is preferred that the optical system according to each of Embodiments consist of eight lenses at most. With this configuration, the optical system can be compact and lightweight while providing required optical performance.

Further, it is desired that the optical system according to each of Embodiments include the aperture stop between the first lens unit L1 and the second lens unit L2. It is preferred that the first lens unit L1 consist of, in order from the object side to the image side, a negative lens, a negative lens, and a positive lens. It is preferred that the second lens unit L2 consist of, in order from the object side to the image side, a positive lens, a negative lens, a positive lens, and a negative lens. It is preferred that the second lens unit L2 consist of, in order from the object side to the image side, a positive lens, a negative lens, a positive lens, a negative lens, and a positive lens.

In each of Embodiments, a so-called "single-vision lens" has been described, but the present invention is not limited thereto. The optical system according to at least one embodiment of the present invention may be a zoom lens having a variable focal length. In that case, it is sufficient that the conditional expressions be satisfied at a wide angle end of the zoom lens.

Figure 7:
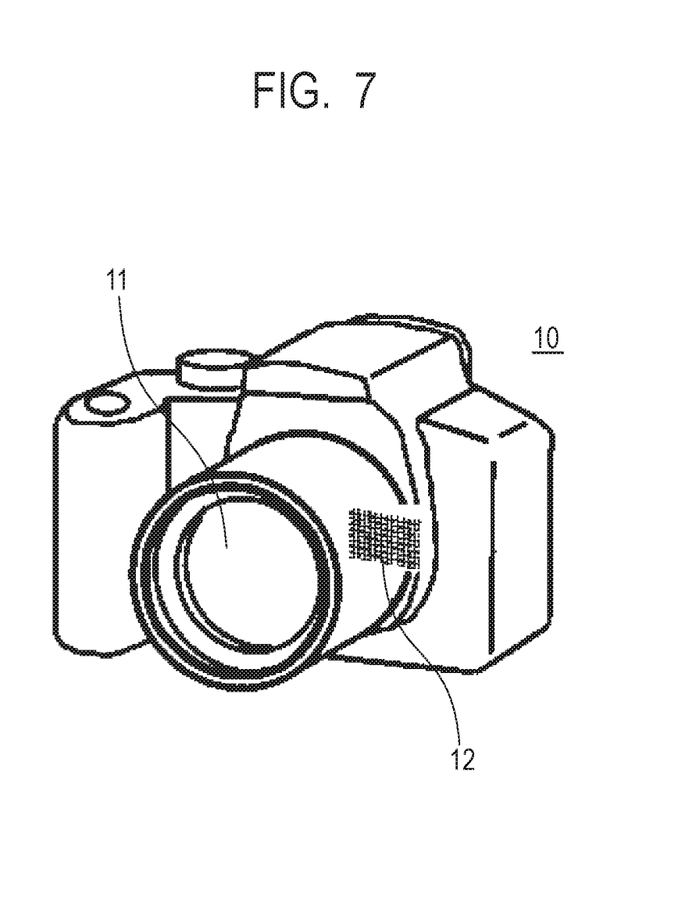
FIG. 7 is a schematic view of a main part of an image pickup apparatus according to at least one embodiment of the present invention.

Next, a digital still camera (image pickup apparatus) which uses the optical system according to at least one embodiment of the present invention, is described with reference to FIG. 7. In FIG. 7, a camera main body 10, and an image pickup optical system 11 consisting of the optical system described in one of Embodiments 1 to 3 are illustrated. An image pickup element (photo-electric conversion element) 12, for example, a CCD sensor or a CMOS sensor, is included in the camera main body, and is configured to receive an object image formed by the image pickup optical system 11.

In the following, specific numerical data (Numerical Embodiments 1 to 3) of Embodiments 1 to 3 is provided. In each set of numerical data, the order as counted from the object side is represented by "i", a curvature radius of the i-th optical surface (i-th surface) is represented by "ri", and an interval on the axis between the i-th surface and the (i+1)-th surface is represented by "di". Further, a refractive index and an Abbe number of a material of an optical member between the i-th surface and the (i+1)-th surface with respect to the d-line are represented by "ndi" and "vdi", respectively. When an X axis is defined in an optical axis direction, an H axis is defined in a direction perpendicular to the optical axis, a paraxial curvature radius is represented by R with a traveling direction of light being positive, a conic constant is represented by K, and aspherical coefficients are represented by A4, A6, and A8, an aspherical shape is expressed by the following expression.

$$X = \frac{\frac{H^2}{R}}{1+\sqrt{1-(1+K)\left(\frac{H}{R}\right)^2}} + A4H^4 + A6H^6 + A8H^8$$

In the numerical data, an asterisk (*) means a surface having an aspherical shape, "e-x" means $\times 10^{-x}$, and BF represents an air-equivalent back focus. Further, a relationship among parameters regarding the above-mentioned conditional expressions and numerical data for the conditional expressions is shown in Table 1.

[Numerical Data 1] (Numerical Embodiment 1 Correspondent to Embodiment 1)

| Unit mm | | | | | |
|---|---|---|---|---|---|
| Surface data | | | | | |
| Surface number | r | d | nd | νd | θgF |
| 1 | 48.855 | 2.20 | 1.76385 | 48.49 | 0.5589 |
| 2 | 11.031 | 8.00 | | | |
| 3 | 13.330 | 1.50 | 1.53775 | 74.70 | 0.5392 |
| 4 | 8.150 | 7.29 | | | |
| 5 | −48.351 | 6.58 | 1.85025 | 30.05 | 0.5979 |
| 6 | −26.933 | 4.00 | | | |
| 7 (Stop) | ∞ | 4.00 | | | |
| 8* | −38.065 | 5.26 | 1.49710 | 81.56 | 0.5377 |
| 9* | −9.535 | 1.12 | | | |
| 10 | 12.869 | 1.50 | 1.85025 | 30.05 | 0.5979 |
| 11 | 9.695 | 9.98 | 1.43700 | 95.10 | 0.5326 |
| 12 | −12.615 | 1.50 | 2.05090 | 26.94 | 0.6054 |
| 13 | −38.769 | 11.72 | | | |
| 14 | ∞ | 1.50 | 1.51633 | 64.14 | 0.5353 |
| 15 | ∞ | 0.50 | | | |
| Image plane | ∞ | | | | |

Aspherical surface data

Eighth surface

K = 6.24411e+001   A4 = −1.54425e−004   A6 = −3.30729e−006

Ninth surface

K = 9.25963e−001   A4 = 4.65880e−005   A6 = −1.63395e−008   A8 = 4.39179e−009

Various data

| | |
|---|---|
| Focal length | 8.10 |
| F-number | 4.00 |
| Half angle of view (degrees) | 90.84 |
| Image height | 11.50 |
| Total lens length | 66.13 |
| BF | 13.21 |

Unit data

| Unit | First surface | Focal length | Lens structure length | Front principal point position | Rear principal point position |
|---|---|---|---|---|---|
| 1 | 1 | −21.96 | 25.56 | −2.21 | −32.37 |
| 2 | 7 | 17.16 | 23.36 | 5.35 | −10.27 |

Single lens data

| Lens | First surface | Focal length |
|---|---|---|
| 1 | 1 | −19.13 |
| 2 | 3 | −43.40 |
| 3 | 5 | 62.67 |
| 4 | 8 | 24.12 |
| 5 | 10 | −59.04 |
| 6 | 11 | 14.52 |
| 7 | 12 | −18.33 |

[Numerical Data 2] (Numerical Embodiment 2 Correspondent to Embodiment 2)

| Unit mm | | | | | |
|---|---|---|---|---|---|
| Surface data | | | | | |
| Surface number | r | d | nd | νd | θgF |
| 1 | 49.348 | 2.20 | 1.77250 | 49.60 | 0.5520 |
| 2 | 11.602 | 8.36 | | | |
| 3 | 16.043 | 1.50 | 1.59522 | 67.74 | 0.5442 |
| 4 | 8.639 | 8.43 | | | |
| 5 | −127.111 | 7.34 | 1.85025 | 30.05 | 0.5979 |
| 6 | −32.443 | 4.00 | | | |
| 7 (Stop) | ∞ | 4.00 | | | |
| 8* | −37.935 | 5.08 | 1.49710 | 81.56 | 0.5377 |
| 9* | −9.832 | 1.12 | | | |
| 10 | 12.990 | 1.50 | 1.85025 | 30.05 | 0.5979 |
| 11 | 10.208 | 7.08 | 1.43700 | 95.10 | 0.5326 |
| 12 | −11.612 | 1.50 | 2.00100 | 29.13 | 0.5997 |
| 13 | −37.657 | 14.46 | | | |
| 14 | ∞ | 1.50 | 1.51633 | 64.14 | 0.5353 |
| 15 | ∞ | 0.50 | | | |
| Image plane | ∞ | | | | |

Aspherical surface data

Eighth surface

K = 6.25847e+001   A4 = −1.19636e−004   A6 = −1.68125e−006

Ninth surface

K = 1.14514e+000   A4 = 6.06644e−005   A6 = −4.08608e−008   A8 = 2.18193e−008

Various data

| | |
|---|---|
| Focal length | 8.05 |
| F-number | 4.00 |
| Half angle of view (degrees) | 90.96 |
| Image height | 11.50 |
| Total lens length | 68.06 |
| BF | 15.95 |

Unit data

| Unit | First surface | Focal length | Lens structure length | Front principal point position | Rear principal point position |
|---|---|---|---|---|---|
| 1 | 1 | −25.02 | 27.82 | −4.13 | −40.41 |
| 2 | 7 | 18.32 | 20.28 | 5.83 | −8.26 |

Single lens data

| Lens | First surface | Focal length |
|---|---|---|
| 1 | 1 | −20.15 |
| 2 | 3 | −34.02 |
| 3 | 5 | 49.47 |
| 4 | 8 | 25.19 |
| 5 | 10 | −74.51 |
| 6 | 11 | 13.79 |
| 7 | 12 | −17.27 |

[Numerical Data 3] (Numerical Embodiment 3 Correspondent to Embodiment 3)

| \multicolumn{6}{c|}{Unit mm} |
|---|---|---|---|---|---|
| \multicolumn{6}{c|}{Surface data} |
| Surface number | r | d | nd | vd | θgF |
| 1 | 47.043 | 2.20 | 1.75500 | 52.32 | 0.5474 |
| 2 | 10.972 | 8.05 | | | |
| 3 | 16.238 | 1.50 | 1.59282 | 68.63 | 0.5446 |
| 4 | 8.975 | 8.46 | | | |
| 5 | −56.618 | 6.70 | 1.85025 | 30.05 | 0.5979 |
| 6 | −25.741 | 4.00 | | | |
| 7 (Stop) | ∞ | 4.00 | | | |
| 8* | −36.732 | 6.16 | 1.49710 | 81.56 | 0.5377 |
| 9* | −10.650 | 1.12 | | | |
| 10 | 16.329 | 1.40 | 1.85025 | 30.05 | 0.5979 |
| 11 | 14.422 | 6.07 | 1.43700 | 95.10 | 0.5326 |
| 12 | −13.895 | 0.24 | | | |
| 13 | −12.740 | 1.10 | 2.00330 | 28.27 | 0.5980 |
| 14 | −50.712 | 0.25 | | | |
| 15 | −625.576 | 2.25 | 1.43700 | 95.10 | 0.5326 |
| 16 | −26.985 | 15.44 | | | |
| 17 | ∞ | 1.50 | 1.51633 | 64.14 | 0.5353 |
| 18 | ∞ | 0.50 | | | |
| Image plane | ∞ | | | | |

Aspherical surface data

Eighth surface

K = 5.26909e+001  A4 = −5.71261e−005  A6 = 4.12322e−007

Ninth surface

K = 1.08114e+000  A4 = 5.10417e−005  A6 = 3.13406e−007  A8 = 8.03706e−009

Various data

| | |
|---|---|
| Focal length | 8.05 |
| F-number | 4.00 |
| Half angle of view (degrees) | 90.07 |
| Image height | 11.40 |
| Total lens length | 70.43 |
| BF | 16.93 |

Unit data

| Unit | First surface | Focal length | Lens structure length | Front principal point position | Rear principal point position |
|---|---|---|---|---|---|
| 1 | 1 | −26.07 | 26.92 | −5.08 | −42.53 |
| 2 | 7 | 19.16 | 22.59 | 8.62 | −8.15 |

Single lens data

| Lens | First surface | Focal length |
|---|---|---|
| 1 | 1 | −19.46 |
| 2 | 3 | −36.67 |
| 3 | 5 | 50.48 |
| 4 | 8 | 27.98 |
| 5 | 10 | −219.23 |
| 6 | 11 | 17.32 |
| 7 | 13 | −17.21 |
| 8 | 15 | 64.46 |

TABLE 1

|  | Embodiment 1 | Embodiment 2 | Embodiment 3 |
|---|---|---|---|
| f | 8.100 | 8.050 | 8.050 |
| f1 | −21.964 | −25.025 | −26.066 |
| f2 | 17.159 | 18.317 | 19.162 |
| TD | 52.915 | 52.105 | 53.505 |
| sk | 13.213 | 15.951 | 16.928 |
| fG1N | −19.134 | −20.147 | −19.464 |
| fG2N | −43.403 | −34.017 | −36.668 |
| fGLN | −18.332 | −17.269 | −17.208 |
| GLNR1 | −12.615 | −11.612 | −12.740 |
| GLNR2 | −38.769 | −37.657 | −50.712 |
| LD | 66.128 | 68.056 | 70.433 |
| (1) fG1N/f1 | 0.871 | 0.805 | 0.747 |
| (2) \|fGLN/f\| | 2.263 | 2.145 | 2.138 |
| (3) SFGLN | 1.965 | 1.892 | 1.671 |
| (4) ndGLN | 2.05090 | 2.00100 | 2.00330 |
| (5) TD/f | 6.533 | 6.473 | 6.647 |
| (6) sk/f | 1.631 | 1.981 | 2.103 |
| (7) fG1/fG2 | 0.441 | 0.592 | 0.531 |
| (8) f1/f2 | −1.280 | −1.366 | −1.360 |
| (9) vdP2 | 88.33 | 88.33 | 90.59 |
| (10) ndN2 | 1.95058 | 1.92563 | 1.92678 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical system consisting of, in order from an object side to an image side:
   a first lens unit having a negative refractive power;
   an aperture stop; and
   a second lens unit having a positive refractive power,
   wherein the first lens unit includes at least two negative lenses including a negative lens G1N arranged closest to the object side in the first lens unit,
   wherein the second lens unit includes at least one negative lens,
   wherein the first lens unit includes a negative lens G2N arranged adjacent to, and on the image side of, the negative lens G1N, and
   wherein the following conditional expressions are satisfied:

$0.1 < fG1N/f1 < 1.0;$ $0.1 < |fGLN/f| < 2.5;$ and $0.441 \leq fG1N/fG2N < 0.80,$ where fG1N represents a focal length of the negative lens G1N, fGLN represents a focal length of a negative lens GLN having a largest negative refractive power in the second lens unit, f represents a focal length of the optical system, f1 represents a focal length of the first lens unit, and fG2N represents a focal length of the negative lens G2N.

2. The optical system according to claim 1, wherein the following conditional expression is satisfied:

$1.0 < (R2GLN + R1GLN)/(R2GLN − R1GLN) < 6.0,$ where R1GLN represents a curvature radius of a lens surface on the object side of the negative lens GLN, and R2GLN represents a curvature radius of a lens surface on the image side of the negative lens GLN.

3. The optical system according to claim 1, wherein the following conditional expression is satisfied:

$1.85 < ndGLN < 2.40,$ where ndGLN represents a refractive index of a material of the negative lens GLN.

4. The optical system according to claim 1, wherein the following conditional expression is satisfied:

$1.0 < TD/f < 10.0,$ where TD represents a total lens length of the optical system.

5. The optical system according to claim 1, wherein the following conditional expression is satisfied:

$0.5 < SK/f < 2.6,$ where SK represents a back focus of the optical system.

6. The optical system according to claim 1, wherein the following conditional expression is satisfied:

$-2.0 < f1/f2 < -1.0,$ where f2 represents a focal length of the second lens unit.

7. The optical system according to claim 1, wherein the second lens unit includes at least one positive lens, and wherein the following conditional expression is satisfied:

$75 < vdP2 < 100,$ where vdP2 represents an average value of an Abbe number of a material of the at least one positive lens included in the second lens unit.

8. The optical system according to claim 1, wherein the following conditional expression is satisfied:

$1.86 < ndN2 < 2.40,$ where ndN2 represents an average value of a refractive index of a material of the negative lens included in the second lens unit.

9. The optical system according to claim 1, wherein the optical system has a lens surface closest to the image side having a convex shape toward the image side.

10. The optical system according to claim 1, wherein the optical system consists of a total of eight lenses at most.

11. An image pickup apparatus comprising:
    an optical system; and
    an image pickup element configured to receive an image formed by the optical system,
    wherein the optical system consists of, in order from an object side to an image side:
    a first lens unit having a negative refractive power;
    an aperture stop; and
    a second lens unit having a positive refractive power,
    wherein the first lens unit including includes at least two negative lenses including a negative lens G1N arranged closest to the object side in the first lens unit,
    wherein the second lens unit includes at least one negative lens,
    wherein the first lens unit includes a negative lens G2N arranged adjacent to, and on the image side of, the negative lens G1N, and
    wherein the following conditional expressions are satisfied:

$0.1 < fG1N/f1 < 1.0;$ $0.1 < |fGLN/f| < 2.5;$ and $0.441 \leq fG1n/fG2N < 0.80,$ where fG1N represents a focal length of the negative lens G1N, fGLN represents a focal length of a negative lens GLN having a largest negative refractive power in the second lens unit, f represents a focal length of the optical system, f1 represents a focal length of the first lens unit, and fG2N represents a focal length of the negative lens G2N.

12. An image pickup apparatus comprising:
   the optical system of claim 1; and
   an image pickup element configured to receive an image formed by the optical system, wherein the following conditional expression is satisfied:

$80°<\omega<120°,$ where "ω" represents an image pickup half angle of view obtained by ray tracing.

13. An optical system consisting of, in order from an object side to an image side:
   a first lens unit having a negative refractive power;
   an aperture stop; and
   a second lens unit having a positive refractive power,
   wherein the first lens unit includes at least two negative lenses including a negative lens G1N arranged closest to the object side in the first lens unit,
   wherein the second lens unit includes at least one negative lens and at least one positive lens, and
   wherein the following conditional expressions are satisfied:

$0.1<fG1N/f1<1.0;$ $0.1<|fGLN/f|<2.5;$ and $75<vdP2<100,$ where fG1N represents a focal length of the negative lens G1N, fGLN represents a focal length of a negative lens GLN having a largest negative refractive power in the second lens unit, f represents a focal length of the optical system, f1 represents a focal length of the first lens unit, and vdP2 represents an average value of an Abbe number of a material of the at least one positive lens included in the second lens unit.

* * * * *